United States Patent
Kang et al.

(10) Patent No.: US 11,524,618 B2
(45) Date of Patent: Dec. 13, 2022

(54) REFRIGERATOR FOR VEHICLE AND VEHICLE

(71) Applicant: LG ELECTRONICS INC., Seoul (KR)

(72) Inventors: Myoungju Kang, Seoul (KR); Deokhyun Youn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 410 days.

(21) Appl. No.: 16/482,194

(22) PCT Filed: Feb. 1, 2018

(86) PCT No.: PCT/KR2018/001392
§ 371 (c)(1),
(2) Date: Jul. 30, 2019

(87) PCT Pub. No.: WO2018/143695
PCT Pub. Date: Aug. 9, 2018

(65) Prior Publication Data
US 2020/0223344 A1    Jul. 16, 2020

(30) Foreign Application Priority Data
Feb. 2, 2017    (KR) .................. 10-2017-0014980

(51) Int. Cl.
*B60N 3/10* (2006.01)
*B60H 1/00* (2006.01)
*B60H 1/32* (2006.01)

(52) U.S. Cl.
CPC ......... *B60N 3/104* (2013.01); *B60H 1/00592* (2013.01); *B60H 1/3223* (2013.01); *B60H 1/3227* (2013.01)

(58) Field of Classification Search
CPC .. B60N 3/104; B60H 1/00592; B60H 1/3223; B60H 1/3227; F25D 2201/14; F25D 23/10; F25D 29/005
See application file for complete search history.

(56) References Cited

U.S. PATENT DOCUMENTS 2,512,077 A * 6/1950 Walker .................... F25B 31/00
                                                        62/466
2,522,623 A    9/1950 Likes et al.
(Continued)

FOREIGN PATENT DOCUMENTS

| CN | 1356019 | 6/2002 |
| CN | 2691933 | 4/2005 |

(Continued)

OTHER PUBLICATIONS

European Search Report dated Oct. 29, 2020 issued in Application No. 18748559.4.

(Continued)

*Primary Examiner* — Emmanuel E Duke
(74) *Attorney, Agent, or Firm* — Ked & Associates, LLP

(57) ABSTRACT

Provided is a refrigerator for a vehicle. The refrigerator for the vehicle may include a cavity or compartment accommodating a product, a machine room disposed at a side of the cavity, a compressor accommodated in the machine room to compress a refrigerant, a condensation module or assembly accommodated in the machine room to condense the refrigerant, an evaporation module or assembly accommodated in the cavity to evaporate the refrigerant and thereby to cool the cavity, a machine room cover defining an inner space of the machine room, and a controller mounted on an outer surface of the machine room cover.

35 Claims, 10 Drawing Sheets

(56) References Cited

U.S. PATENT DOCUMENTS

| | | | | | |
|---|---|---|---|---|---|
| 4,545,211 | A | * | 10/1985 | Gaus | B60N 3/104 62/115 |
| 4,779,923 | A | * | 10/1988 | Lang | B60N 3/104 312/235.2 |
| 5,168,718 | A | * | 12/1992 | Bergmann | B60N 3/104 62/244 |
| 6,704,202 | B1 | * | 3/2004 | Hamaoka | H05K 7/20463 62/505 |
| 7,937,954 | B2 | * | 5/2011 | Kang | B60N 2/793 62/3.3 |
| 2004/0139757 | A1 | * | 7/2004 | Kuehl | B60N 2/5628 62/237 |
| 2009/0058120 | A1 | * | 3/2009 | Ioka | B60N 2/79 296/24.34 |
| 2012/0104923 | A1 | * | 5/2012 | Jung | F25D 23/066 312/406 |
| 2013/0029082 | A1 | * | 1/2013 | Park | E04B 1/803 428/69 |
| 2013/0105496 | A1 | * | 5/2013 | Jung | F25D 23/062 220/592.05 |
| 2013/0118196 | A1 | | 5/2013 | Chen et al. | |
| 2016/0341360 | A1 | * | 11/2016 | Uraguchi | B63B 25/14 |

FOREIGN PATENT DOCUMENTS

| | | | |
|---|---|---|---|
| CN | 2691933 Y | * | 4/2005 |
| CN | 2691933 Y | * | 4/2005 |
| CN | 101376357 | | 3/2009 |
| CN | 101898500 | | 12/2010 |
| CN | 104401263 | | 3/2015 |
| CN | 204895231 | | 12/2015 |
| CN | 105387671 A | | 3/2016 |
| CN | 205655556 | | 10/2016 |
| CN | 106066110 A | | 11/2016 |
| CN | 106196878 | | 12/2016 |
| DE | 29910901 | | 8/1999 |
| EP | 0479251 | | 4/1992 |
| GB | 2 235 757 | | 3/1991 |
| JP | S50-36168 | | 4/1975 |
| JP | S56-40061 | | 4/1981 |
| WO | WO 2016/192978 | | 12/2016 |
| WO | WO-2016192978 A1 | * | 12/2016 ............ F25D 23/00 |

OTHER PUBLICATIONS

International Search Report and Written Opinion dated Jun. 5, 2018 issued in Application No. PCT/KR2018/001392.

Chinese Office Action dated May 8, 2021 issued in CN Application No. 201880010114.0.

Chinese Office Action dated Nov. 23, 2021 issued in Application 201880010114.0.

* cited by examiner

[Fig. 1]
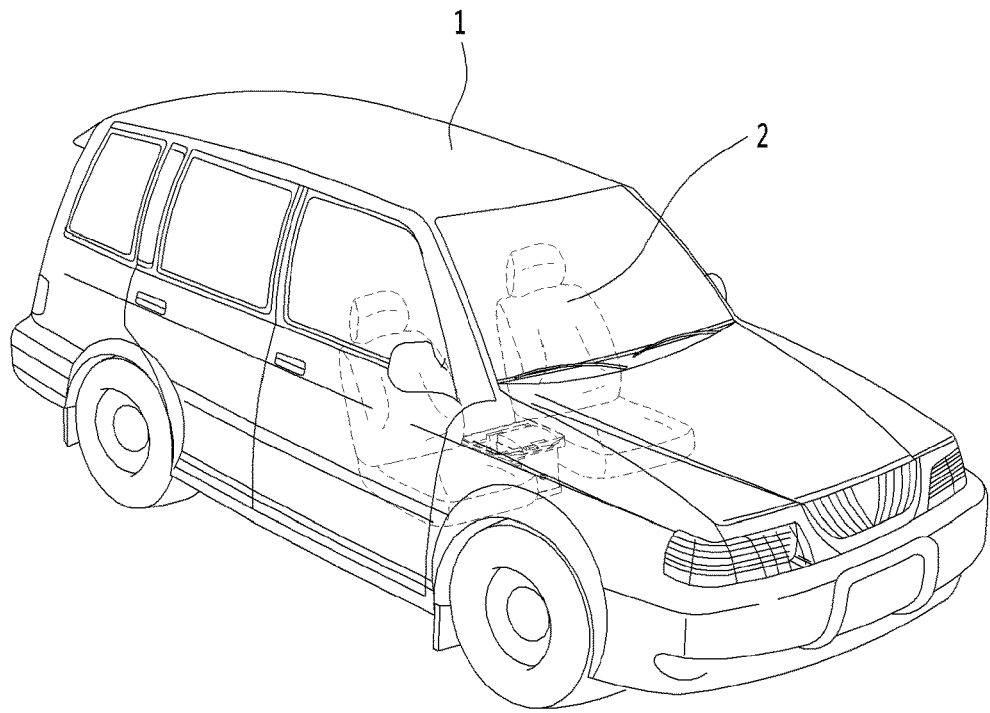
[Fig. 2]
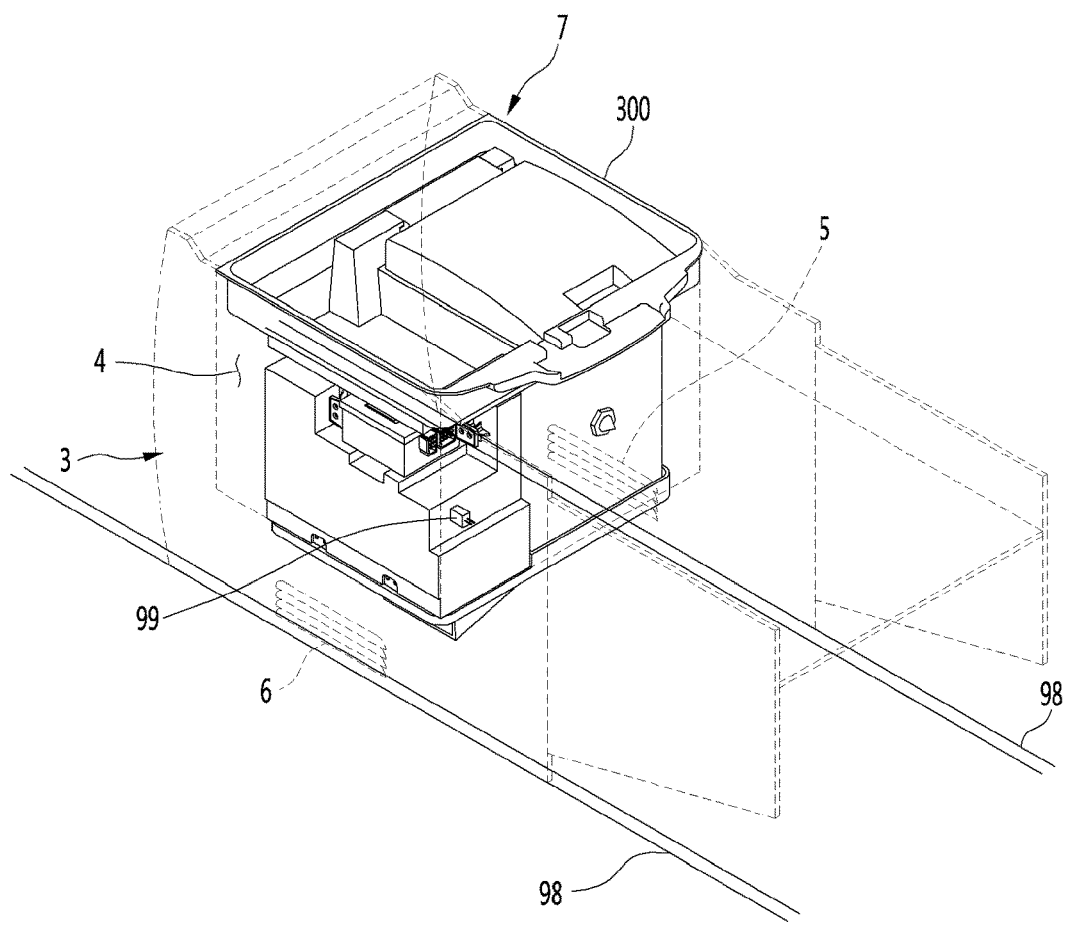

[Fig. 3]
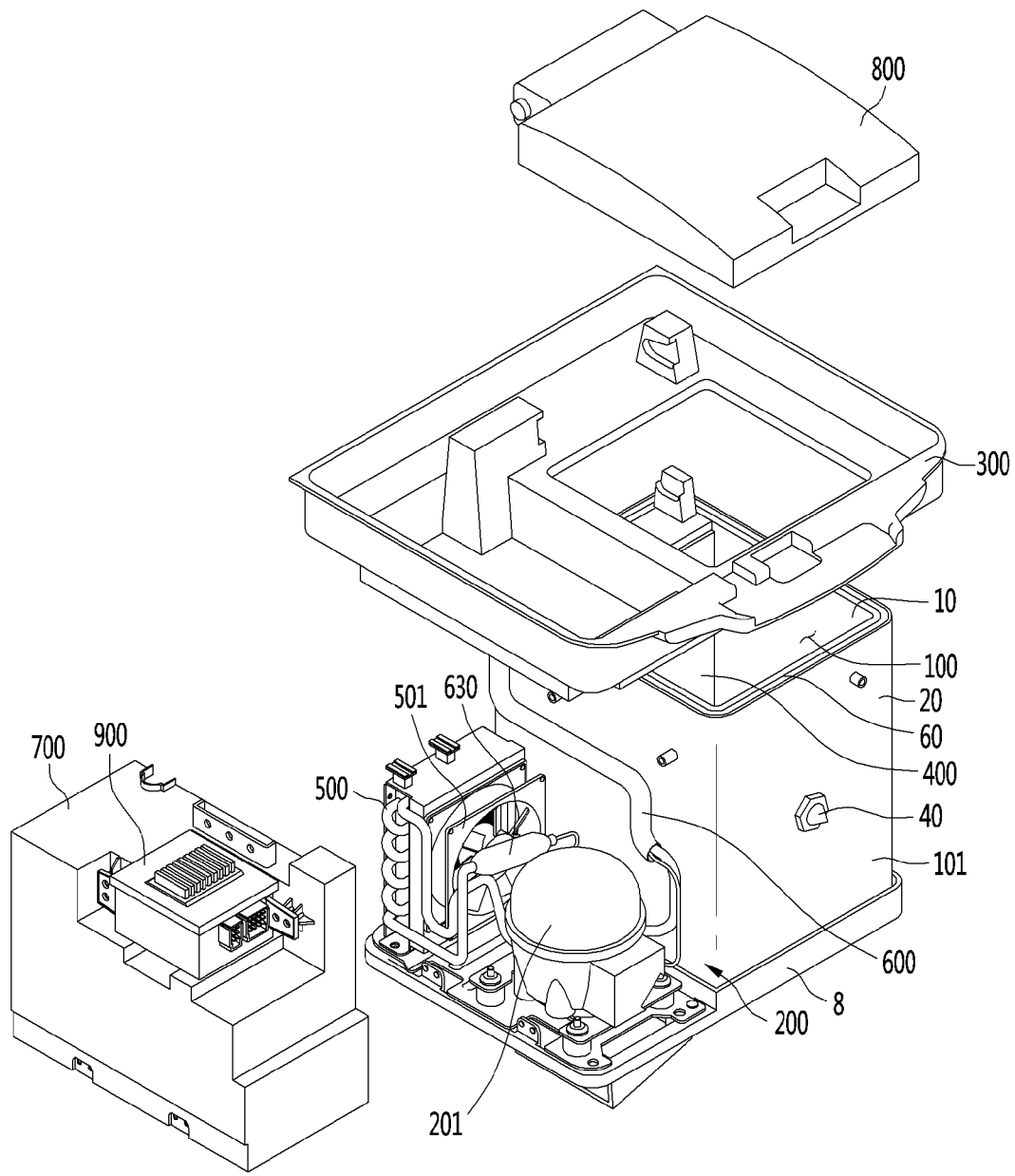

[Fig. 4]
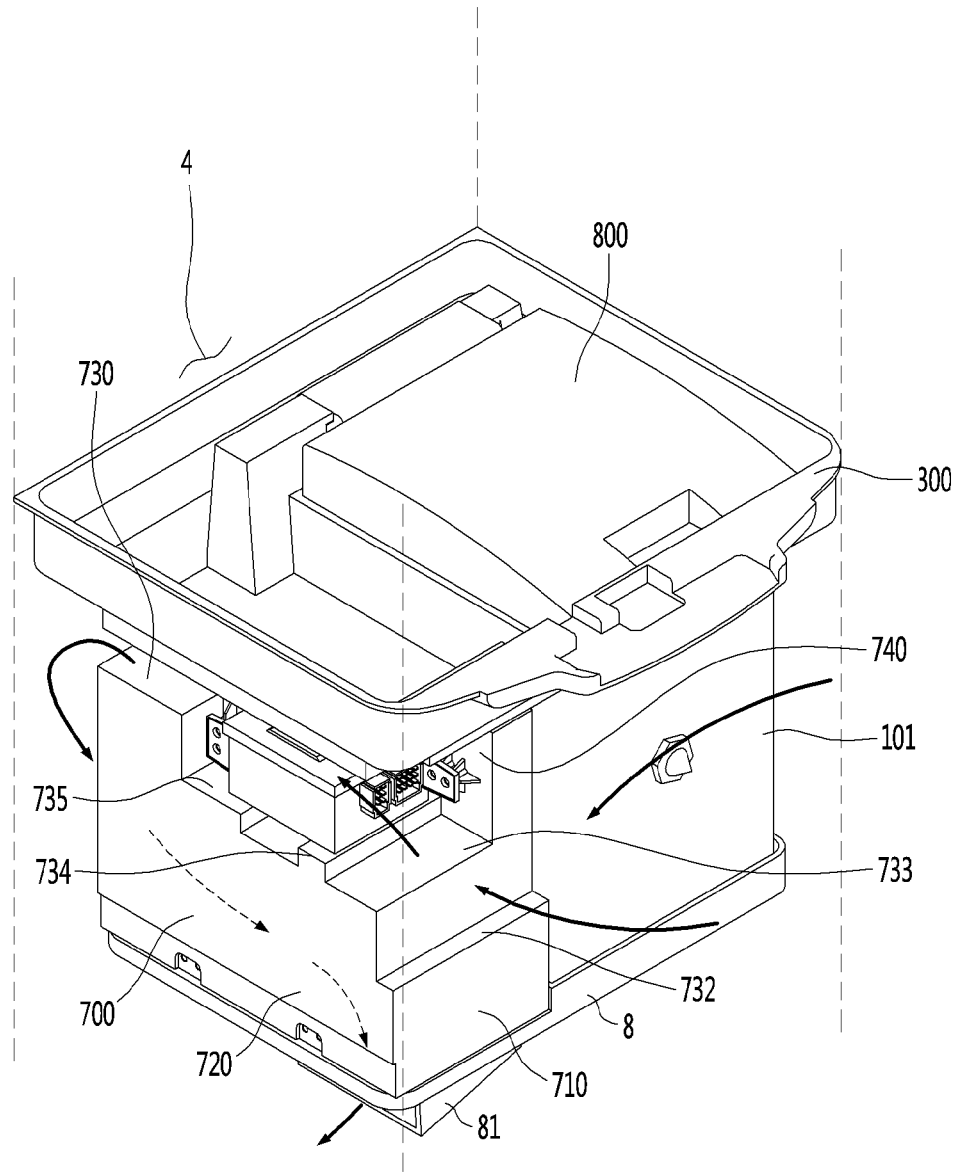

[Fig. 10]
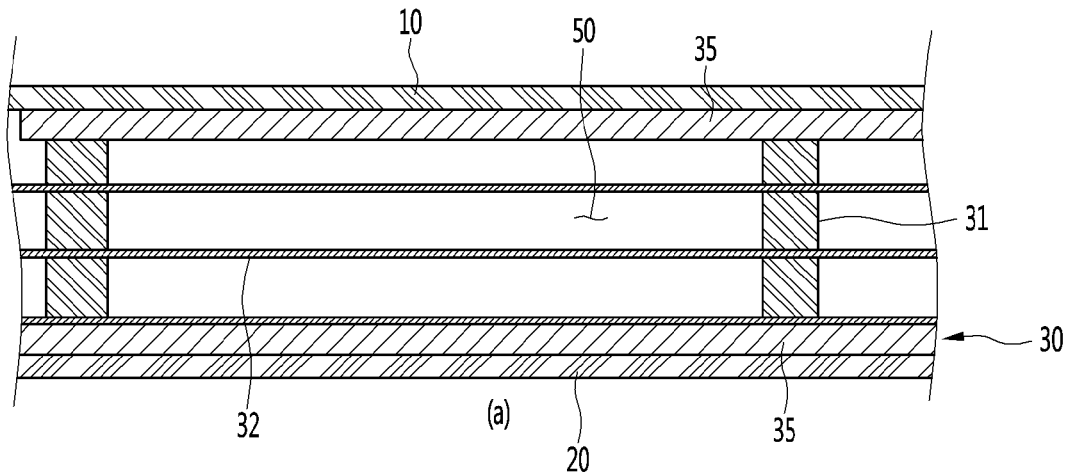
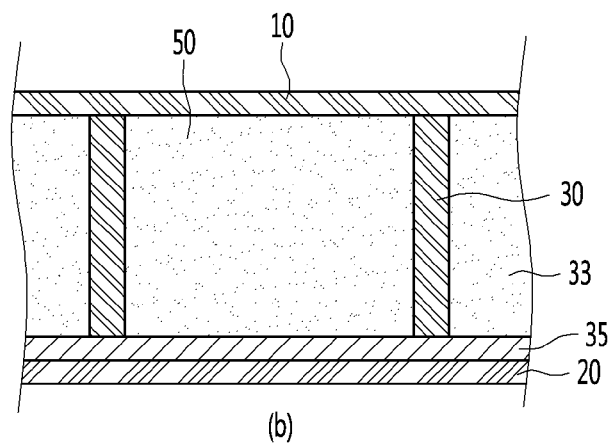
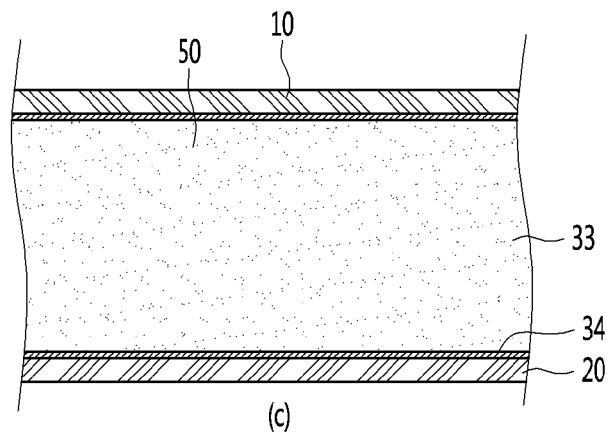

[Fig. 11]
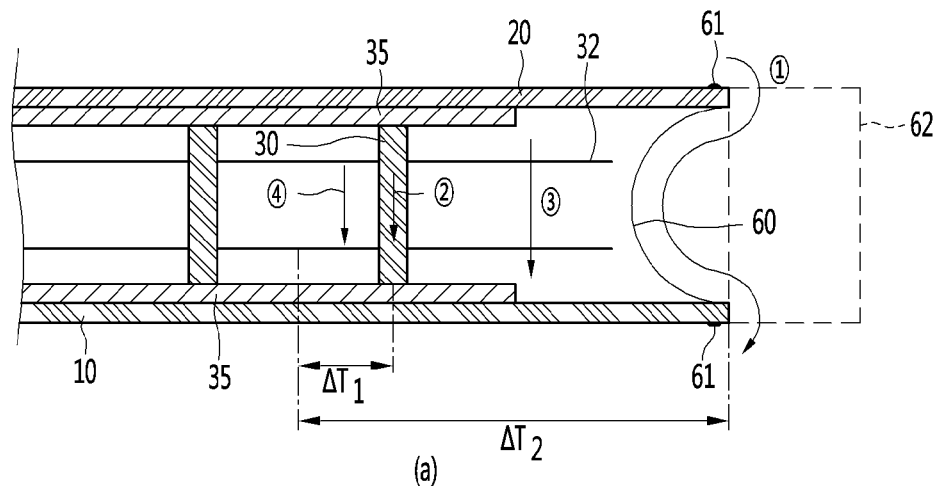
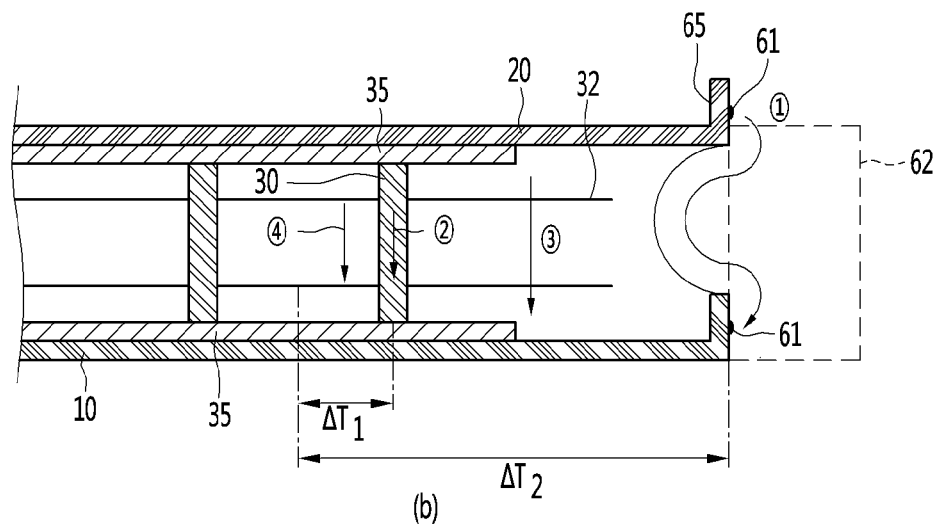

[Fig. 12]
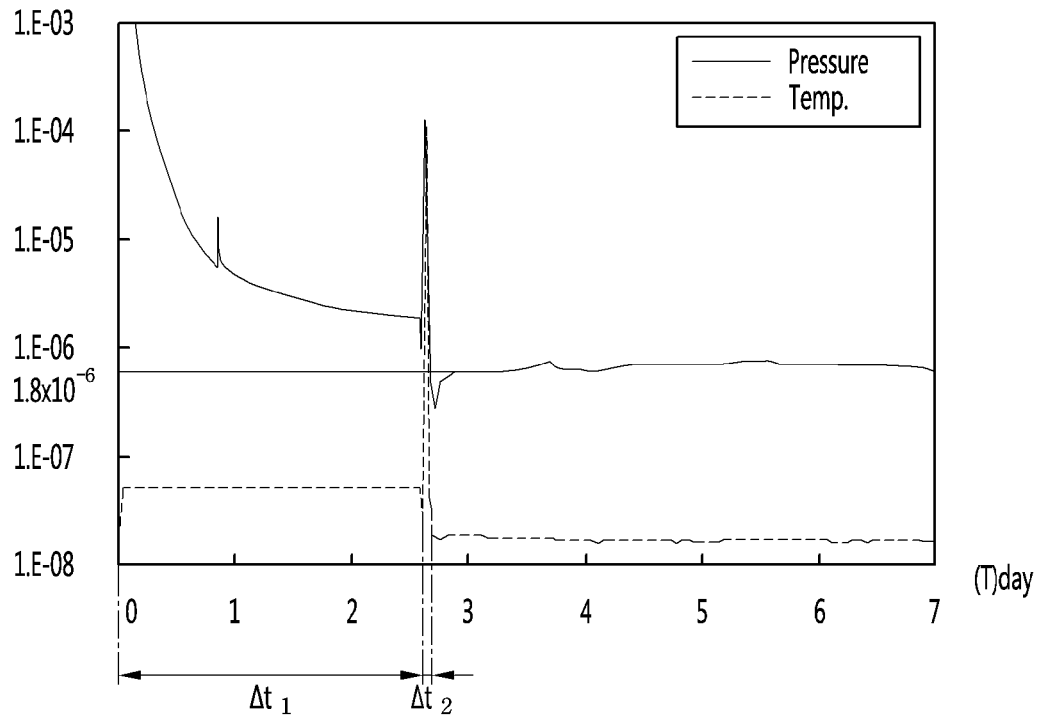
[Fig. 13]
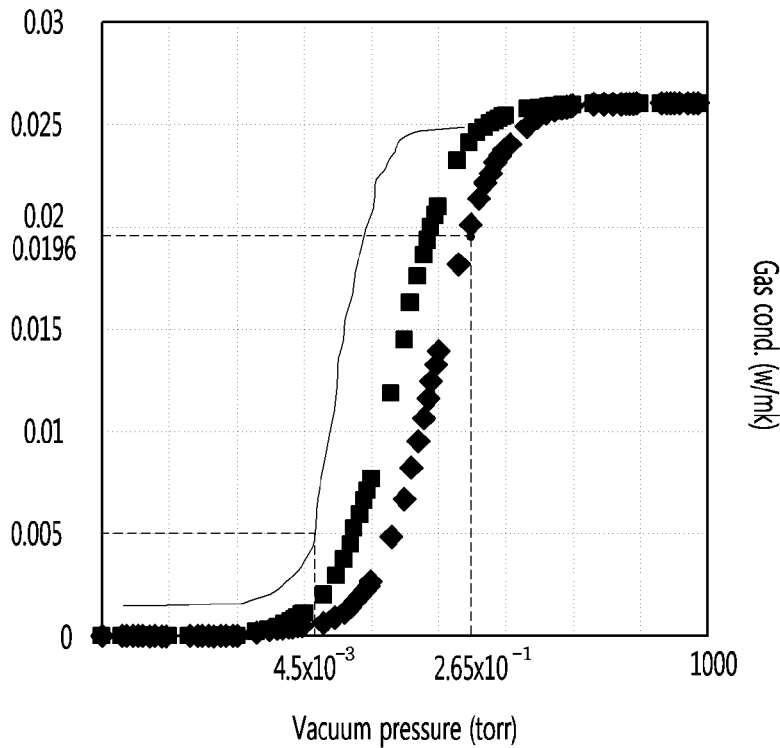

REFRIGERATOR FOR VEHICLE AND VEHICLE

CROSS-REFERENCE TO RELATED PATENT APPLICATIONS

This application is a U.S. National Stage Application under 35 U.S.C. § 371 of PCT Application No. PCT/KR2018/001392, filed Feb. 1, 2018, which claims priority to Korean Patent Application No. 10-2017-0014980, filed Feb. 2, 2017, whose entire disclosures are hereby incorporated by reference.

TECHNICAL FIELD

The present disclosure relates to a refrigerator for a vehicle and a vehicle.

BACKGROUND ART

Refrigerators are apparatuses for storing products such as foods received in the refrigerator at a low temperature including sub-zero temperatures. As a result of this action, there is an advantage that a user's access or intake with respect to the products may be improved, or a storage period of the products may be lengthened.

Refrigerators are classified into indoor refrigerators using a commercial power source or outdoor refrigerators using a portable power source. In addition, in recent years, a refrigerator for a vehicle, which is used after it is fixedly mounted on the vehicle, is increasing in supply. The refrigerator for the vehicle is further increasing in demand due to an increase in supply of vehicles and an increase in premium-class vehicles.

A conventional configuration of the refrigerator for the vehicle will be described.

First, there is an example in which heat in the refrigerator is forcibly discharged to an outside of the refrigerator by using a thermoelement. However, there is a limitation in that a cooling rate is slow due to low thermal efficiency of the thermoelement, which may deteriorate user's satisfaction.

For another example, there is an example in which a refrigerant or cold air is drawn from an air conditioning system installed for air-conditioning an entire interior of the vehicle and used as a cooling source for the refrigerator for the vehicle.

In this example, there is a disadvantage that a separate flow path of air or refrigerant is required to draw the air or refrigerator from the air conditioning system of the vehicle. Also, there is a limitation that low-temperature energy is lost during the movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied.

However, in this example, since a part constituting the refrigeration cycle is large in size, most of the parts are mounted on a trunk, and only a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo that is capable of being loaded in the trunk.

DISCLOSURE

Technical Problem

Embodiments also provide a vehicle refrigerator directly accessible to a driver while using refrigeration cycle, and a vehicle.

Embodiments also provide a vehicle refrigerator that is capable of increasing a capacity of the refrigerator, and a vehicle.

Embodiments also provide a vehicle refrigerator that is capable of solving a limitation in which products accommodated in the refrigerator is slowly cooled, and a vehicle.

Embodiments provide a vehicle refrigerator that is capable of improving energy efficiency, and a vehicle.

Embodiments also provide a vehicle refrigerator that is capable of blocking an access of foreign substances, and a vehicle.

Technical Solution

In an embodiment, a refrigerator for a vehicle includes a cavity or a compartment accommodating a product, a machine room disposed at a side of the cavity, a machine room cover defining an inner space of the machine room, and a controller mounted on the machine room cover. According to the above-described constituents, the refrigerator that is adequate for the vehicle may be realized. Here, a refrigeration system of the refrigerator may be applied to improve satisfaction in use of the refrigerator.

A side surface of the cavity may define at least a portion of an inner space of the machine room to realize the vehicle refrigerator in a more narrow space.

The machine room cover may be coupled to a side surface of the cavity to prevent foreign substances from being introduced and improve space utilization.

The controller may be coupled to the outside of a top surface of the machine room cover to prevent a problem in operation of the controller disposed in a relatively low-temperature space from occurring.

The controller may be disposed on a stepped part of the machine room cover to realize a stable operation of the controller.

A compressor control circuit controlling the compressor may be disposed in the controller to stably perform a control operation of the compressor that is a main part.

The controller may include a control board accommodated in the controller and a heat sink exposed to the outside of the controller so that external air is smoothly cooled to improve an operation of the compressor and reliability of an entire operation of the vehicle refrigerator.

A compressor control circuit and a temperature sensor may be disposed on a heat sink corresponding part or a heat sink pad coming into contact with the heat sink on the control board to improve cooling performance with respect to main parts.

A DC-DC converter and a diode may be disposed on the heat sink corresponding part to more quickly dissipate heat due to a switching device.

In another embodiment, a vehicle includes at least a pair of seats or a plurality of seats spaced apart from each other to allow a user to be seated, a console disposed in a space between the pair of seats or between adjacent seats and having a console space therein, a console cover covering the console space, a suction port disposed on one or a first side of left and right sides of the console, and an exhaust port disposed on the other or a second side of the left and right sides of the console to provide a refrigerating space for the vehicle.

The vehicle includes a refrigerator bottom frame disposed on a lower portion of an inner space of the console, a cavity provided at one side on the refrigerator bottom frame to accommodate a product, a machine room provided at the other side on the refrigerator bottom frame, a machine room cover partitioning a space of the machine room, and a controller disposed in a space between the console cover and the machine room cover so that the controller generating heat is stably cooled to improve operation stability of the product.

Air introduced through the suction port may flow through the space between the console cover and the machine room cover to secure a cooling passage.

The air flowing through the space between the console cover and the machine room cover may be introduced into the machine room to optimally cool the controller and then cool other parts within the machine room.

The controller may be disposed outside a top surface of the machine room cover to solve the problem in structure for cooling the controller.

The controller may include a control board accommodated in the controller and a heat sink exposed to the outside of the controller. Thus, the cooling performance may be significantly improved.

A compressor control circuit for controlling the compressor may be disposed on the control board to secure a normal operation of the compressor that is a main part.

A compressor control circuit may be disposed on a heat sink corresponding part coming into contact with the heat sink on the control board to quickly dissipate heat generated to the outside when switching for the operation of the compressor is performed.

In further another embodiment, a refrigerator for a vehicle includes a cavity accommodating a product, a machine room provided at a side of the cavity and supported by a single frame together with the cavity, a machine room cover defining an inner space of the machine room, and a controller mounted on the machine room cover. Thus, the whole configuration of the refrigerator may be compact, and stability in control function of the refrigerator may be improved.

The refrigerator may include a compressor accommodated in the machine room to compress a refrigerant, a condensation module or assembly accommodated in the machine room to condense the refrigerant, and an evaporation module or assembly accommodated in the cavity to evaporate the refrigerant and thereby to cool the cavity to more quickly perform the refrigerating action, thereby improve satisfaction of consumers. The condensation and evaporation modules may also be referred to as heat exchange modules or assemblies.

The machine room cover may be coupled to the cavity to realize a more compact product.

A compressor control circuit controlling the compressor may be disposed in the controller to improve operation reliability of the compressor.

The controller may perform an overall control of the refrigerator for the vehicle to reliably realize a connection system of a control signal and drive the vehicle refrigerator without problems of the heat dissipation in the narrow space.

Advantageous Effects

According to the embodiments, the electric parts that are necessary for operating the vehicle refrigerator disposed in the narrow space may be stably operate.

BRIEF DESCRIPTION OF THE DRAWINGS

FIG. 1 is a perspective view of a vehicle according to an embodiment.
FIG. 2 is an enlarged perspective view illustrating a console of the vehicle.
FIG. 3 is a schematic perspective view illustrating the inside of a vehicle refrigerator.
FIG. 4 is a view for explaining an air flow outside a machine room of the vehicle refrigerator.
FIG. 10 is a view illustrating an internal configuration of a vacuum adiabatic body according to various embodiments.
FIG. 11 is a view of a conductive resistance sheet and a peripheral portion of the conductive resistance sheet.
FIG. 12 is a graph illustrating results obtained by observing a time and a pressure in a process of exhausting the inside of the vacuum adiabatic body when a supporting unit is used.
FIG. 13 is a graph illustrating results obtained by comparing a vacuum pressure with gas conductivity.

DETAILED DESCRIPTION

Figure 5:
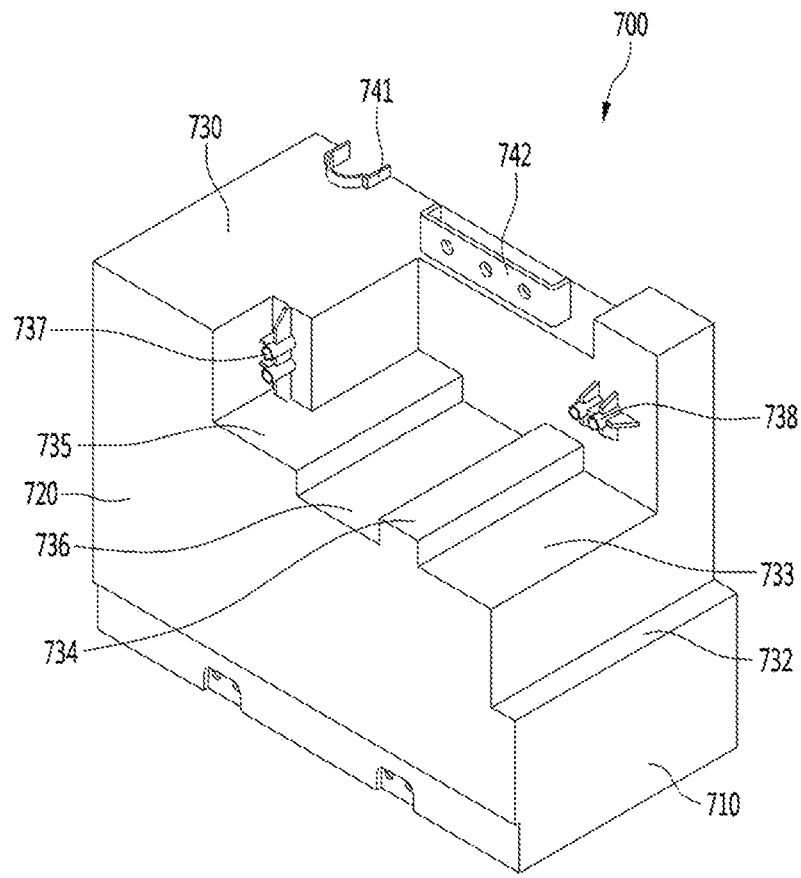
FIG. 5 is a perspective view of a machine room cover.

In the following description according to embodiments with reference to the drawings, the same reference numerals are given to different drawings in the case of the same constituents.

Also, in the description of each drawing, the description will be made with reference to the direction in which the vehicle is viewed from the front of the vehicle, rather than the front viewed by the driver based on the traveling direction of the vehicle. For example, the driver is on the right, and the assistant driver or passenger is on the left.

FIG. 1 is a perspective view of a vehicle according to an embodiment.

Referring to FIG. 1, a seat 2 on which a user is seated is provided in a vehicle 1. The seat 2 may be provided in a pair to be horizontally spaced apart from each other. A console is provided between the seats 2, and a driver places items that are necessary for driving or components that are necessary for manipulating the vehicle in the console. Front seats on which the driver and the assistant driver or passenger are seated may be described as an example of the seats 2.

It should be understood that the vehicle includes various components, which are necessary for driving the vehicle, such as a moving device such as a wheel, a driving device such as an engine, and a steering device such as a steering wheel.

The refrigerator for the vehicle according to an embodiment may be preferably placed in the console. However, an embodiment of the present disclosure is not limited thereto. For example, the vehicle refrigerator may be installed in various spaces. For example, the vehicle refrigerator may be installed in a space between rear seats, a door, a glove box, and a center fascia. This is one of factors that the vehicle refrigerator according to an embodiment is capable of being installed only when power is supplied, and a minimum space is secured. However, it is an advantage of the embodiment in that it may be installed in the console between the seats, which is limited in space due to limitations in vehicle design.

FIG. 2 is an enlarged perspective view illustrating the console of the vehicle.

Referring to FIG. 2, a console 3 may be provided as a separate part that is made of a material such as a resin. A steel frame 98 may be further provided below the console 3 to maintain strength of the vehicle, and a sensor part 99 such as a sensor may be provided in a spacing part between the console 3 and the steel frame 98. The sensor part 99 may be a part that is necessary for accurately sensing an external signal and measuring a signal at a position of the driver. For example, an airbag sensor that directly impacts the life of the driver may be mounted.

The console 3 may have a console space 4 therein, and the console space 4 may be covered by a console cover or a cover 300. The console cover 300 may be fixed to the console 3 in a fixed type. Thus, it is difficult for external foreign substances to be introduced into the console through the console cover 300. A vehicle refrigerator 7 is seated in the console space 4.

A suction port 5 may be provided in a first or right surface of the console 3 to introduce air within the vehicle into the console space 4. The suction port 5 may face the driver. An exhaust port 6 may be provided in a second or left surface of the console 3 to exhaust warmed air while the vehicle refrigerator operates from the inside of the console space 4. The exhaust port 6 may face the assistant driver or passenger. A grill may be provided in each of the suction port 5 and the exhaust port 6 to prevent a user's hand from being inserted and thereby to provide safety, prevent a falling object from being introduced, and allow air to be exhausted to flow downward so as not to be directed to the person.

FIG. 3 is a schematic perspective view illustrating the inside of the vehicle refrigerator.

Referring to FIG. 3, the vehicle refrigerator 7 includes a refrigerator bottom frame or a refrigerator base 8 supporting parts, a machine room 200 provided in a left side of the refrigerator bottom frame 8, and a cavity or compartment 100 provided in a right side of the refrigerator bottom frame 8. The machine room 200 may be covered by a machine room cover 700, and an upper side of the cavity 100 may be covered by the console cover 300 and a door 800.

The machine room cover 700 may not only guide a passage of the cooling air, but also prevent foreign substances from being introduced into the machine room 200.

A controller 900 may be disposed on the machine room cover 700 to control an overall operation of the vehicle refrigerator 7. Since the controller 900 is installed at the above-described position, the vehicle refrigerator 7 may operate without problems in a proper temperature range in a narrow space inside the console space 4. That is to say, the controller 900 may be cooled by air flowing through a gap between the machine room cover 700 and the console cover 300 and separated from an inner space of the machine room 200 by the machine room cover 700. Thus, the controller 900 may not be affected by heat within the machine room 200.

The console cover 300 may not only cover an opened upper portion or top of the console space 4, but also cover an upper end edge of the cavity 100. A door 800 may be further installed on the console cover 300 to allow the user to cover an opening through which products are accessible to the cavity 100. The door 800 may be opened by using rear portions of the console cover 300 and the cavity 100 as hinge points. Here, the opening of the console cover 300, the door 800, and the cavity 100 may be performed by conveniently manipulating the door 800 by the user because the console cover 300, the door 800, and the cavity 100 are horizontally provided when viewed from the user and also disposed at a rear side of the console.

A condensation module or assembly 500, a dryer 630, and a compressor 201 may be successively installed in the machine room 200 in a flow direction of the cooling air. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are accessible to the cavity 100.

The cavity 100 has an opened top surface or a top opening and five surfaces that are covered by a vacuum adiabatic body 101.

The vacuum adiabatic body 101 may include a first plate member 10 providing a boundary of a low-temperature inner space of the cavity 100, a second plate member 20 providing a boundary of a high-temperature outer space, and a conductive resistance sheet 60 blocking heat transfer between the plate members 10 and 20. Since the vacuum adiabatic body 101 has a thin adiabatic thickness to maximally obtain adiabatic efficiency, a large capacity of the cavity 100 may be realized.

An exhaust and getter port or an exhaust port 40 for exhaust of the inner space of the vacuum adiabatic body 101 and for installing a getter that maintains the vacuum state may be provided on one surface. The exhaust and getter port 40 may provide an exhaust and getter together to better contribute to miniaturization of the vehicle refrigerator 7.

An evaporation module or assembly 400 may be installed in the cavity 100. The evaporation module 400 may forcibly blow the evaporation heat introduced into the cavity 100 through the refrigerant conduit 600 into the cavity 100. The evaporation module 400 may be disposed at a rear side within the cavity 100.

FIG. 4 is a view for explaining an air flow outside a machine room of the vehicle refrigerator.

Referring to FIG. 4, air introduced into the suction port 5 moves to a left side of the vehicle refrigerator through a space between the vacuum adiabatic body 101 defining a front wall of the cavity 100 and a front surface of the console space 4. Since a heating source is not provided at a right side of the vehicle refrigerator, the suction air may be maintained at its original temperature.

The air moving to the left side of the vehicle refrigerator may be changed in direction to a rear side to move along a top surface of the machine room cover 700 outside the machine room 200.

To smoothly guide the air flow, the machine room cover 700 may have a height that gradually increases backward from a front surface 710. Also, to provide a region in which the controller 900 is disposed, and prevent the parts within the machine room 200 from interfering in position with each other, a stepped part may be disposed on a top surface of the machine room cover 700.

In detail, a first step portion or part 732, a second stepped part or portion 733, and a third stepped part or portion 735 may be successively provided backward from the front surface. A controller placing part or portion 734 having the same height as the third stepped part 735 is disposed on the second stepped part 733. Due to this structure, the controller 900 may be disposed in parallel to the third stepped part 735 and the controller placing part 734.

The air moving along the top surface of the machine room cover 700 may cool the controller 900. When the controller 900 is cooled, the air may be slightly heated.

The air moving up to the rear side of the machine room cover 700 flows downward. A large cover suction hole (not shown) that is opened in the rear surface of the machine room cover 700 may be provided. For this, a predetermined space may be provided between the rear surface of the machine room cover 700 and the rear surface of the console space 4.

FIG. 5 is a perspective view of the machine room cover.

Referring to FIG. 5, the machine room cover 700 has a front surface 710, a top surface 730, and a left or side surface 720 as described above. A hole may be defined in a rear surface to allow air to be introduced.

The inner space of the machine room 100 may be defined by the machine room cover 700, and the right and bottom surfaces of the machine room cover 700 may be opened or provided as empty spaces. The right surface of the machine room 200 becomes the right surface of the cavity, and the bottom surface of the machine room 200 may be the bottom of the machine room 200 or a machine room bottom frame. The left surface 720 may also be referred to as a first side surface, and the right surface may also be referred to as a second side surface or opened side surface.

Also, the upper surface 730 is provided with stepped parts or portions 732, 733, and 735 to smoothly flow the air and prevent problem in positions of the internal parts of the machine room 200 and the external parts of the machine room 200 from occurring.

A controller placing part or portion 734 protruding upward from a top surface of the second stepped part 733 is provided. A top surface of the controller placing part 734 and a bottom surface of the third stepped part 375 may have the same height. Thus, the controller 900 may be disposed in a horizontal or level state.

A recess part or portion 736 having the same height as the top surface of the second stepped part 733 may be defined between the controller placing part 734 and the bottom surface of the third stepped part 735. The recess part 733 may provide a space under the controller 900, and external air may be introduced into or discharged from the space. Thus, cooling of the controller 900 may be performed through the upper portion and the lower portion thereof. Thus, the cooling of the controller 900 may be more smoothly performed, and an operation temperature of the controller 900 may be satisfied in the narrow space within the console 3.

The machine room cover 700 may be coupled to an outer wall of the vacuum adiabatic body 101 defining the cavity 100. For this, a cavity coupling part 742 may be disposed at the right side of the machine room cover 700, and the machine room cover 700 and the cavity 100 may be provided as one body.

Since the machine room cover 700 completely seals a left surface of the cavity 100, the air within the machine room 200 may not leak to the outside. Thus, the recirculation of the air may be prevented to improve the cooling efficiency.

The controller 900 is installed in the inner spaces between or above the second stepped part 733 and the third stepped part 735. The controller 900 is coupled and fixed to the machine room cover 700, and controller coupling parts 737 and 738 for the coupling of the controller are provided.

A through-hole 741 guiding the refrigerant conduit 600 that guides the refrigerant into the cavity 100 through the upper opening of the cavity is defined in the right side of the machine room cover 700. The refrigerant conduit 600 passing through the through-hole 741 may correspond to or include a regeneration conduit adiabatic member or regeneration adiabatic member. The regeneration conduit adiabatic member may be a member for thermally insulating a regeneration conduit system that exchanges heat of a first refrigerant conduit, which is introduced into the evaporation module 400, and heat of a second refrigerant conduit, which is discharged from the evaporation module 400. The regeneration conduit system (i.e., the regeneration adiabatic member and the first and second refrigerant conduits) may constitute a portion of the refrigerant conduit 600.

Figure 6:
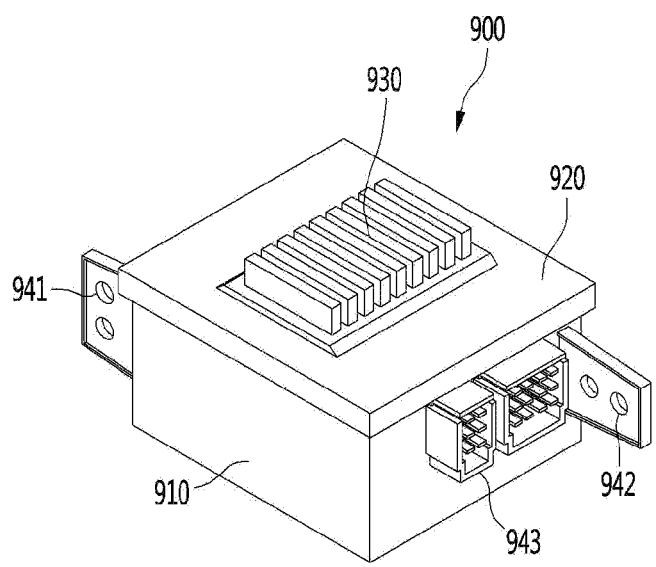
FIG. 6 is a perspective view of a controller.
Figure 7:
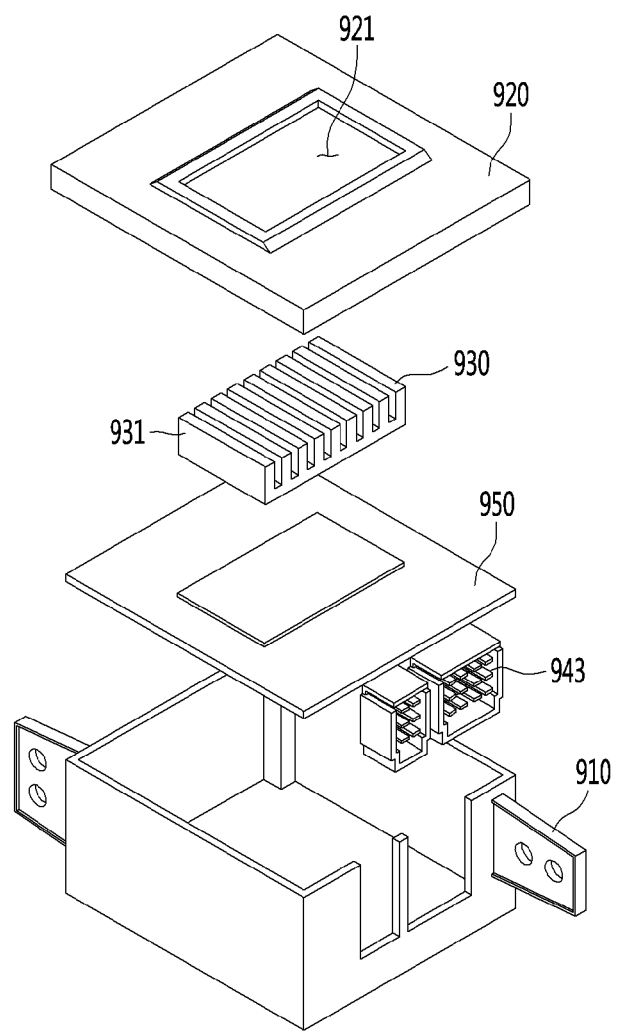
FIG. 7 is an exploded perspective view of a controller.

FIG. 6 is a perspective view of the controller, and FIG. 7 is an exploded perspective view of the controller.

Referring to FIGS. 6 and 7, the controller 900 includes a lower case 910 and an upper cover 920, which provide an inner space.

Cover coupling parts 941 and 942, which are aligned with the control coupling parts 737 and 738 of the machine room cover 700, may be provided in the lower case 910 and be horizontally seated on the top surface of the machine room cover 700. As an example, the cover coupling parts 941 and 942 may be brackets with holes, and controller coupling parts 737 and 738 may include pins or shafts that are inserted into the holes of the cover coupling parts 941 and 942. A connection terminal 943 may be disposed on one side of the lower case 910 to perform electrical connection of a power source and a sensor.

All electrical connection terminals provided in the vehicle refrigerator 7 may use a double lock connection terminals so as not to release the coupling due to the driving of the vehicle and vibration due to the driving.

A control board 950 is disposed in an inner space defined by the lower case 910 and the upper cover 920.

A plurality of heat generation sources are mounted on the control board 950. Among them, the compressor driving circuit for driving the compressor 201 includes a switching circuit, and a large amount of heat is generated because relatively large current flows through the compressor 201.

The compressor driving circuit is generally coupled to a side surface of the compressor 201. However, in the case of the embodiment, since the inner space of the machine room 200 is narrow as the vehicle refrigerator 7, and the position of the compressor 201 is located just before the discharge of the machine room 200, the temperature of the air flowing is high. Thus, it is inappropriate to install the compressor driving circuit in a space close to the compressor 201.

If the compressor driving circuit is provided together with the control board 950 that controls the whole of the vehicle refrigerator 7, the space of the vehicle refrigerator 7 may be more compact. However, it is preferable that a heat dissipation structure having high cooling efficiency is provided because a large amount of heat further increases by mounting a plurality of parts on the narrow control board 950, which may affect the operation of the parts.

To solve this problem, a heat sink 930 is provided which comes into contact with a heat generation portion of the control board 950 to promote the heat radiation of the control board 950. A cover hole 921 that is opened to a top surface is provided in the upper cover 920. The heat sink 930 is exposed to the outside through the cover hole 921.

The exposed heat sink 930 is cooled by the air passing through the spacing part between the machine room cover 700 and the console cover 300. In the spacing part between the machine room cover 700 and the console cover 300, relatively cool air in which the air introduced into the console space 4 does not cool other parts, flows. Therefore, the cooling action of the heat sink 930 may be smoothly performed. The heat sink 930 may include a plurality of fins 931.

A configuration of the controller 900 will be described in more detail.

Figure 8:
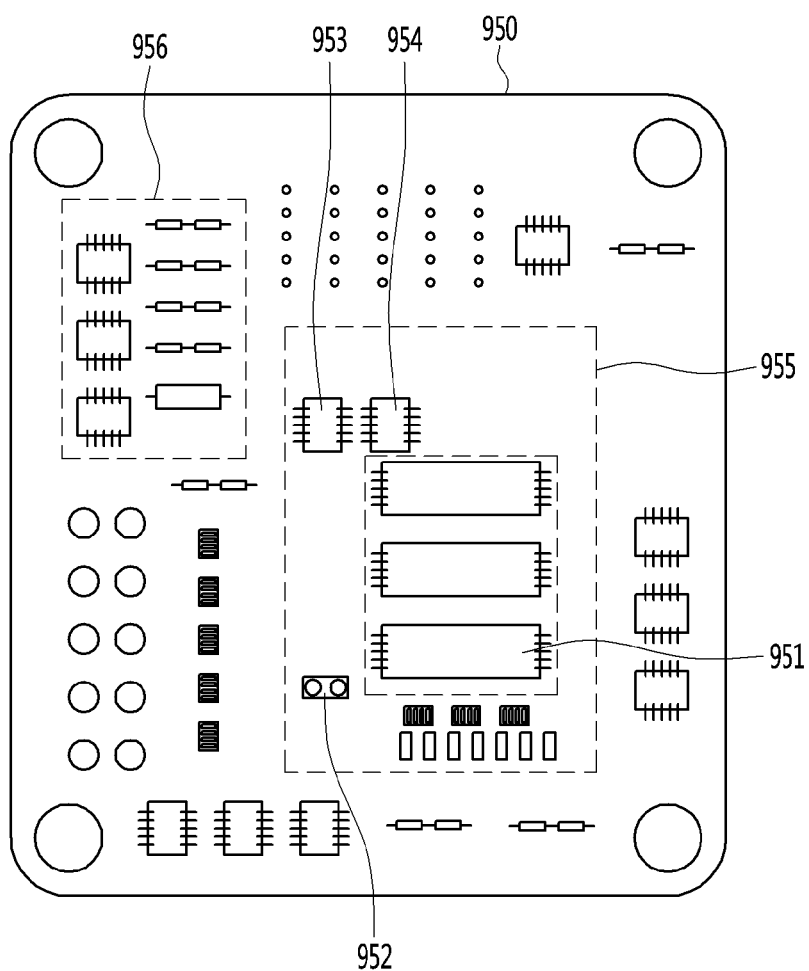
FIG. 8 is a schematic circuit diagram of a control board.

FIG. 8 is a schematic circuit diagram of the control board.

Referring to FIG. 8, the control board 950 includes a refrigerator control circuit 956 for controlling an operation of the vehicle refrigerator 7 and a compressor control circuit 951 for controlling an operation of the compressor 201.

The refrigerator control circuit 956 may perform functions such as door opening/closing, a fan operation, data storage, state determination, and a command. The compressor control circuit 951 is configured to control rotation of a motor of the compressor 201 and has a high heat generation value due to execution of the switching operation and supply of the driving current.

High-temperature heat generated in the compressor control circuit 951 affects other circuits of the control board 950 and causes a risk of fire. Thus, a temperature sensor 952 is provided in the vicinity of the compressor control circuit 951 to stop the compressor 201 when the temperature sensor 952 senses a temperature equal to or higher than a threshold or predetermined value. Therefore, the temperature sensor 952 does not rise above the threshold value.

Another circuit part having a high heat generation value in the control board is a DC-DC converter 953 and a diode 954 for boosting a voltage from about 12 volts to about 40 volts. Although these parts are not the same as the compressor control circuit 951, the parts act as large factors of the temperature rise, and if the parts do not operate normally, the parts may lead to malfunction of the vehicle refrigerator 7.

A region including the compressor control circuit 951 and the temperature sensor 952 and also including the DC-DC converter 953 and the diode 954 is referred to as a heat sink corresponding portion or a heat sink pad 955, and the heat sink 930 may come into direct or indirect contact with the region corresponding to the heat sink corresponding portion 955. The heat sink corresponding portion 955 may also be referred to as a heat sink placement region.

As described above, since an installation place of the heat sink 930 is a place where relatively cool air flows as the outer space of the machine room cover 700, the cooling operation through the heat sink 930 may be performed smoothly. Thus, the cooling of the heat generation parts may be smoothly performed.

Figure 9:
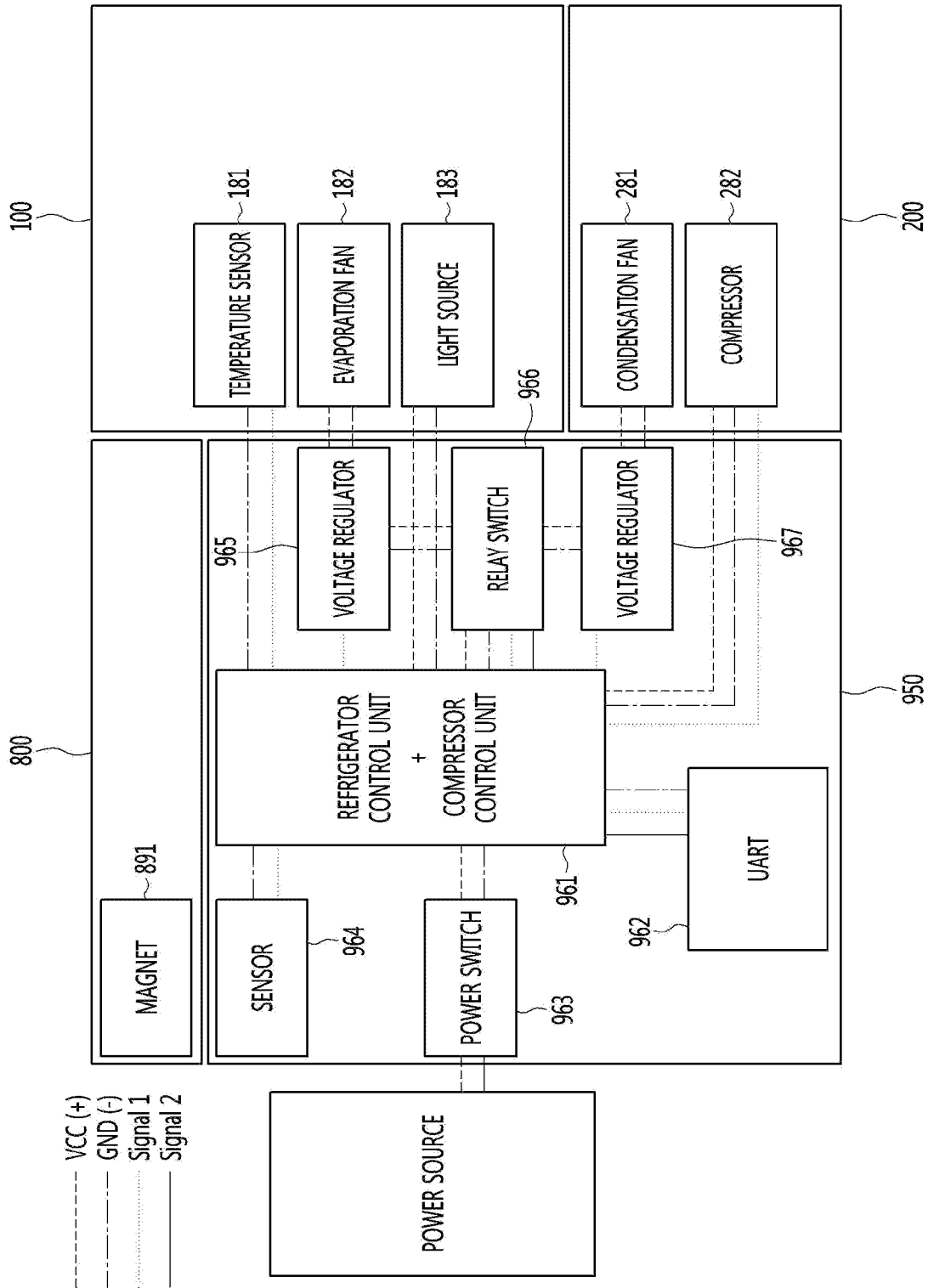
FIG. 9 is a block diagram for explaining control of the vehicle refrigerator.

FIG. 9 is a block diagram for explaining control of the vehicle refrigerator.

Referring to FIG. 9, the vehicle refrigerator 7 may include a cavity or compartment 100, a machine room 200, a door 800, and a control board 950 for controlling the cavity 100, the machine room 200, and the door 800.

The cavity 100 is provided with a temperature sensor 181 for measuring a temperature in the cavity 100, an evaporation fan 182 included in the evaporation module 400 to cause cold air circulation inside the cavity 100, and a light source 183 that brightens the inside of the cavity 100. Each of the parts is controlled by a control or processing unit or module 961 of the control board 950.

A condensation fan 281 (condensation fan 501 in FIG. 3) that draws an air flow inside the machine room 200 and a compressor 282 (compressor 201 in FIG. 3) that draws a refrigerant flow from the refrigeration system are provided in the machine room 200. The condensation fan 281 and the compressor 282 are controlled by the control unit 961.

A magnet 891 may be installed on the door 800, and a corresponding operation may be performed by the controller 961 when the access or strength of the magnet 891 is detected by a sensor 964.

A relay switch 966 operates under the control of the control unit 961, and voltage regulators 965 and 967 control an operation of fans 182 and 281.

A Universal Asynchronous Receiver/Transmitter (UART) port for inputting data may be provided on the control board 950. Necessary data may be stored by the UART port.

A power switch 963 for interrupting power supplied from a 12-volt power source is disposed on the control board 950.

The control unit 961, e.g., a processor, may be provided with a refrigerator control unit (refrigerator controller) and a compressor control unit (compressor controller) in a single chip.

When the control unit 961 is interpreted as a single chip, a compressor control circuit for switching and supplying a high voltage is provided in plurality of chips between the compressor 282 and the controller 961.

An operation of each part will be described sequentially.

When the vehicle refrigerator normally operates, the compressor 282, the condensation fan 281, and the evaporation fan 182 may operate. Of course, an intermittent operation may naturally occur depending on an operation state such as a supercooled state. The intermittent operation is sensed by the temperature sensor 181 and then controlled. An on/off operation of the compressor 282, the condensation fan 281, and the evaporation fan 182 may not be said to be performed together, and an on/off state may be different depending on a flow of the refrigerant and the current temperature.

When the door 800 is opened during the operation of the vehicle refrigerator 7, the sensor 964 senses a change in magnetic field due to disengagement or approach of the magnet 891 to sense the opening of the door 800. Thereafter, the compressor 282 may be turned off, or the fans 182 and 281 may be stopped. When the opening of the door 800 is sensed, the evaporation fan 182 may be turned off at all times. This is for preventing cold air from being lost.

FIG. 10 is a view illustrating an internal configuration of a vacuum adiabatic body according to various embodiments.

First, referring to FIG. 10a, a vacuum space part 50 is provided in a third space or vacuum space having a different pressure from first and second spaces (or inner and outside spaces), preferably, a vacuum state, thereby reducing adiabatic loss. The first space may be a space inside the cavity 100, while a second space may be a space outside the cavity 100. The third space may be provided at a temperature between the temperature of the first space and the temperature of the second space.

The third space is provided as a space in the vacuum state. Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit or bar 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 may include a resin selected from the group consisting of polycarbonate (PC), glass fiber PC, low outgassing PC, polyphenylene sulfide (PPS), and liquid crystal polymer (LCP) so as to obtain high compressive strength, low outgassing and water absorption, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members 10 and 20, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, at least one sheet of radiation resistance sheet 32 may be provided at a certain distance so as not to contact each other. At least one radiation resistance sheet 32 may be provided in a state in which it contacts the inner surface of the first or second plate member 10 or 20. Even when the vacuum space part 50 has a low height, one sheet of radiation resistance 32 sheet may be inserted. In case of the vehicle refrigerator 7, one sheet of radiation resistance sheet 32 may be inserted so that the vacuum adiabatic body 101 has a thin thickness, and the inner capacity of the cavity 100 is secured.

Referring to FIG. 10b, the distance between the plate members 10 and 20 is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body 101 may be fabricated without using the radiation resistance sheet 32.

Referring to FIG. 10c, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body may be fabricated without using the supporting unit 30. In other words, the porous substance 33 may simultaneously serve as the radiation resistance sheet 32 and the supporting unit 30.

FIG. 11 is a view of a conductive resistance sheet and a peripheral portion of the conductive resistance sheet.

Referring to FIG. 11a, the first and second plate members 10 and 20 are to be sealed so as to vacuum the interior of the vacuum adiabatic body 101. In this case, since the two plate members 10 and 20 have different temperatures from each other, heat transfer may occur between the two plate members 10 and 20. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the vehicle refrigerator 7, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60, may be provided as an adiabatic structure, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described. Heat passing through the vacuum adiabatic body may be divided into surface conduction heat ① conducted along a surface of the vacuum adiabatic body 101, more specifically, the conductive resistance sheet 60, supporter conduction heat ② conducted along the supporting unit 30 provided inside the vacuum adiabatic body 101, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the plate members 10 and 20 may be changed, and the length of the conductive resistance sheet 60 may be changed. The transfer heat may be changed depending on a difference in temperature between the spaces (the first and second spaces) respectively provided by the plate members 10 and 20. In the embodiment, a preferred configuration of the vacuum adiabatic body 101 has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as about 19.6 mW/mK.

By performing a relative analysis on heat transfer amounts of the vacuum adiabatic body 101 of the embodiment, a heat transfer amount by the gas conduction heat ③ may become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Figure 1.

$$eK\ \text{solid conduction heat} > eK\ \text{radiation transfer heat} > eK\ \text{gas conduction heat} \qquad \text{Math Figure 1}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body 101 is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 a sectional area (A) of the conductive resistance sheet, a length (L) of the conductive resistance sheet, and a thermal conductivity (k) of the conductive resistance sheet 60 (the thermal conductivity of the conductive resistance sheet 60 is a material property of a material and may be obtained in advance). For the supporter conduction heat, a conductive calorific value may be obtained through a temperature difference ($\Delta T$) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance 33 is provided inside the vacuum space part 50, porous substance conduction heat ⑤ may be a sum of the supporter conduction heat ② and the radiation transfer heat ④. The porous substance conduction heat ⑤ may be changed depending on various variables including a kind, an amount, and the like of the porous substance 33.

In the second plate member 20, a temperature difference between an average temperature of the second plate 20 and a temperature at a point at which a heat transfer path passing through the conductive resistance sheet 60 meets the second plate 20 may be largest. For example, when the second space is a region hotter than the first space, the temperature at the point at which the heat transfer path passing through the conductive resistance sheet meets the second plate member 20 becomes lowest. Similarly, when the second space is a region colder than the first space, the temperature at the point at which the heat transfer path passing through the conductive resistance sheet 60 meets the second plate member 20 becomes highest.

This means that the amount of heat transferred through other points except the surface conduction heat passing through the conductive resistance sheet should be controlled, and the entire heat transfer amount satisfying the vacuum adiabatic body 101 may be achieved only when the surface conduction heat occupies the largest heat transfer amount. To this end, a temperature variation of the conductive resistance sheet 60 may be controlled to be larger than that of the plate member 20.

Physical characteristics of the parts constituting the vacuum adiabatic body 101 will be described. In the vacuum adiabatic body 101, a force by vacuum pressure is applied to all of the parts. Therefore, a material having strength (N/m2) of a certain level may be used.

Referring to FIG. 11b, this configuration is the same as that of FIG. 11a except that portions at which the first plate member 10, the second plate member 20 are coupled to the conductive resistance sheet 60. Thus, the same part omits the description and only the characteristic changes are described in detail.

Ends of the plate members 10 and 20 may be bent to the second space having a high temperature to form a flange part 65. A welding part 61 may be provided on a top surface of the flange part 65 to couple the conductive resistance sheet 60 to the flange part 65. In this embodiment, the worker may perform welding while facing only any one surface. Thus, since it is unnecessary to perform two processes, the process may be convenient.

It is more preferable to apply the case in which welding of the inside and the outside are difficult as illustrated in FIG. 11a because a space of the vacuum space part 50 is narrow like the vehicle refrigerator 7.

FIG. 12 is a graph illustrating results obtained by observing a time and a pressure in a process of exhausting the inside of the vacuum adiabatic body 101 when a supporting unit 30 is used.

Referring to FIG. 12, in order to create the vacuum space part 50 to be in the vacuum state, a gas in the vacuum space part 50 is exhausted by a vacuum pump while evaporating a latent gas remaining in the parts of the vacuum space part 50 through heating. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8\times10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body 101, thereby setting the minimum internal pressure of the vacuum space part 50 to $1.8\times10^{-6}$ Torr.

FIG. 13 is a graph obtained by comparing a vacuum pressure with gas conductivity.

Referring to FIG. 13, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member 10 or 20 adjacent thereto. When the radiation resistance sheet 32 does not exist inside vacuum space part 50, the gap is a distance between the first and second plate members 10 and 20.

It may be seen that, since the size of the gap is small at a point corresponding to a typical effective heat transfer coefficient of 0.0196 W/mK, which is provided to an adiabatic material formed by foaming polyurethane, the vacuum pressure is $2.65\times10^{-1}$ Torr even when the size of the gap is 2.76 mm. Meanwhile, it may be seen that the point at which reduction in adiabatic effect caused by gas conduction heat is saturated even though the vacuum pressure is decreased is a point at which the vacuum pressure is approximately $4.5\times10^{-3}$ Torr. The vacuum pressure of $4.5\times10^{-3}$ Torr may be defined as the point at which the reduction in adiabatic effect caused by gas conduction heat is saturated. Also, when the effective heat transfer coefficient is 0.1 W/mK, the vacuum pressure is $1.2\times10^{-2}$ Torr.

When the vacuum space part 50 is not provided with the supporting unit 30 but provided with the porous substance 33, the size of the gap ranges from a few micrometers to a few hundreds of micrometers. In this case, the amount of radiation heat transfer is small due to the porous substance 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0\times10^{-4}$ Torr. Also, the vacuum pressure at the point at which the reduction in adiabatic effect caused by gas conduction heat is saturated is approximately $4.7\times10^{-2}$ Torr. Also, the pressure where the reduction in adiabatic effect caused by gas conduction heat reaches the typical effective heat transfer coefficient of 0.0196 W/mK is 730 Torr.

When the supporting unit 30 and the porous substance 33 are provided together in the vacuum space part, a vacuum pressure may be created and used, which is middle pressure between the vacuum pressure when only the supporting unit 30 is used and the vacuum pressure when only the porous substance 33 is used.

INDUSTRIAL APPLICABILITY

According to the embodiments, the vehicle refrigerator that receives only power from the outside and is independent apparatus may be efficiently realized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A refrigerator for a vehicle, comprising:
a compartment;
a machine room provided at a side of the compartment;
a compressor provided in the machine room to compress a refrigerant;
a condenser provided in the machine room to condense the refrigerant;
an evaporator provided in the compartment to evaporate the refrigerant and thereby to cool the compartment;
a machine room cover coupled to the compartment to cover an inner space of the machine room; and
a controller mounted on the machine room cover,
wherein the compartment includes a vacuum adiabatic wall for insulation,
wherein the controller is provided on a stepped portion of the machine room cover.

2. The refrigerator according to claim 1, wherein an outer surface of the compartment defines at least one inner surface of the machine room such that the outer surface of the compartment and the machine room cover define the inner space of the machine room.

3. The refrigerator according to claim 1, wherein the controller is provided on a top surface of the machine room cover and coupled to an outside surface of the machine room cover.

4. The refrigerator according to claim 1, wherein a compressor control circuit controlling the compressor is provided in the controller, and wherein the controller having the compressor control circuit is exposed outside the machine room.

5. The refrigerator according to claim 1, wherein the controller comprises:
a control board; and
a heat sink exposed to an outside of the controller.

6. The refrigerator according to claim 5, wherein a compressor control circuit and a temperature sensor are provided on a heat sink pad of the control board, and wherein the heat sink is provided above the heat sink pad.

7. The refrigerator according to claim 6, wherein a DC-DC converter and a diode are provided on the heat sink pad.

8. A vacuum adiabatic body comprising:
a first plate;
a second plate; and
a vacuum space part provided between the first plate and the second plate,
wherein the vacuum adiabatic body is configured to form a compartment, the compartment accommodating a product,
wherein a machine room is positioned at a side of the compartment,
wherein a machine room cover is coupled to the compartment to be positioned to cover the machine room, and
wherein at least one of a controller or a heating source part is provided on a stepped portion of the machine room cover.

9. The vacuum adiabatic body according to claim 8, wherein at least one of a coupling part, or a through hole is provided on the stepped portion of the machine room cover.

10. A vacuum adiabatic body comprising:
a first plate;
a second plate; and
a vacuum space part provided between the first plate and the second plate;
wherein the vacuum adiabatic body is configured to form a compartment, the compartment accommodating a product, wherein a machine room is positioned at a side of the compartment, wherein a first cover is coupled to the compartment and positioned to cover the machine room and a second cover is coupled to the compartment and spaced apart from the first cover, wherein at least one of a controller or a heating source part is provided in a space between the first cover and the second cover, and wherein the at least one of the controller or the heating source part is covered by the second cover such that the at least one of the controller or the heating source part is not seen unless the second cover is opened or removed.

11. The vacuum adiabatic body according to claim 10, wherein at least one of a coupling part or a through hole is provided on the first cover.

12. A vacuum adiabatic body comprising:
a first plate;
a second plate; and
a vacuum space part provided between the first plate and the second plate,
wherein the vacuum adiabatic body is configured to form a compartment, the compartment accommodating a product,
wherein a machine room is positioned at a side of the compartment,
wherein a machine room cover is coupled to the compartment and positioned to cover the machine room, and
wherein air heat-exchanged with at least one of a controller or a heating source part is introduced into the machine room, the at least one of the controller or the heating source part being positioned adjacent to an outer surface of the machine room cover.

13. The vacuum adiabatic body according to claim 12, further comprising at least one of a coupling part or a through hole positioned on the machine room cover.

14. The vacuum adiabatic body according to claim 12, where air having passed through an air inlet is introduced to the at least one of the controller or the heating source part, the air inlet being defined as an opening through which external air is introduced.

15. The vacuum adiabatic body according to claim 12, where the air passed through the inner space of the machine room is discharged through an air outlet, the air outlet being defined as an opening through the air heat-exchanged with the at least one of the controller or the heating source part is discharged from the inner space of the machine room.

16. A vacuum adiabatic body comprising:
a first plate;
a second plate;
a vacuum space part provided between the first plate and the second plate; and
a support configured to maintain a distance between the first plate and the second plate, the support being positioned next to the first plate,
wherein the vacuum adiabatic body is configured to form a compartment, the compartment accommodating a product,
wherein a machine room is positioned at a side of the compartment,
wherein a machine room cover is positioned to cover the machine room, and
wherein a through hole and a refrigerant conduit that passes through the through hole is provided on the machine room cover.

17. The vacuum adiabatic body according to claim 16, wherein a heating source part is connected with the machine room cover such that a cooling action is performed.

18. The vacuum adiabatic body according to claim 16, wherein a cavity coupling part for coupling the machine room cover to the compartment is provided on the machine room cover.

19. The vacuum adiabatic body according to claim 16, wherein a controller coupling part for coupling a controller to the machine room cover is provided on the machine room cover.

20. The vacuum adiabatic body according to claim 16, wherein a controller including a compressor driving circuit such that a space of the machine room is more compact is provided on the machine room cover.

21. The vacuum adiabatic body according to claim 16, wherein the support includes
a bar extending in a height direction of the vacuum space,
a support plate extending in a width direction of the vacuum space, and
a porous material in the vacuum space.

22. The vacuum adiabatic body according to claim 21, wherein when at least one of the support plate or the bar is positioned in the vacuum space, a vacuum pressure V is defined in the vacuum space such that $1.8 \times 10^{-6}$ Torr $< V \leq 2.65 \times 10^{-1}$ Torr.

23. The vacuum adiabatic body according to claim 22, wherein the vacuum pressure V is defined such that $4.5 \times 10^{-3}$ Torr $< V \leq 2.65 \times 10^{-1}$ Torr.

24. The vacuum adiabatic body according to claim 23, wherein the vacuum pressure V is defined such that $1.2 \times 10^{-2}$ Torr $\leq V \leq 2.65 \times 10^{-1}$ Torr.

25. The vacuum adiabatic body according to claim 21, wherein when the porous material is positioned in the vacuum space, and a vacuum pressure V is defined in the vacuum space such that $2.0 \times 10^{-4}$ Torr $\leq V \leq 4.7 \times 10^{-2}$ Torr.

26. The vacuum adiabatic body according to claim 16, wherein a material of the support includes a resin or a material selected from the group consisting of polycarbonate (PC), glass fiber PC, low outgassing PC, polyphenylene sulfide (PPS), and liquid crystal polymer (LCP).

27. The vacuum adiabatic body according to claim 16, further comprising a radiation resistance sheet to reduce heat radiation between the first and second plates through the vacuum space, the radiation resistance sheet being positioned next to the first plate.

28. The vacuum adiabatic body according to claim 27, wherein the radiation resistance sheet is provided in a plate shape over an area of the vacuum space.

29. The vacuum adiabatic body according to claim 16, comprising a conductive resistance sheet provided to prevent heat conduction between the first plate and the second plate, the conductive resistance sheet being connected to the first plate.

30. The vacuum adiabatic body according to claim 29, wherein the conductive resistance sheet has:
a smaller thickness than the first plate, or
a heat conduction distance that is longer than a linear distance of each of the first and second plates.

31. The vacuum adiabatic body according to claim 16, wherein a gas in the vacuum space is exhausted by a vacuum pump while the vacuum space is being baked during $\Delta t1$.

32. The vacuum adiabatic body according to claim 16, wherein a getter is activated while the vacuum space is being disconnected from the vacuum pump and being baked during $\Delta t2$, the getter being placed in the vacuum space.

33. The vacuum adiabatic body according to claim 16, wherein a gas in the vacuum space is exhausted by a vacuum pump while the vacuum space being baked during Δt1, and the gas in the vacuum space is absorbed by a getter while the vacuum space is being baked during Δt2, the Δt1 is larger than the Δt2.

34. The vacuum adiabatic body according to claim 33, wherein a maximum of a vacuum pressure in the vacuum space during the Δt2 is smaller than a maximum of a vacuum pressure in the vacuum space during the Δt1.

35. The vacuum adiabatic body according to claim 33, wherein a minimum of a vacuum pressure in the vacuum space during the Δt2 is smaller than a minimum of a vacuum pressure in the vacuum space during the Δt1.

\* \* \* \* \*